United States Patent [19]

Garner

[11] Patent Number: 4,687,444
[45] Date of Patent: Aug. 18, 1987

[54] BRAILLE READING SYSTEM

[75] Inventor: H. Douglas Garner, Newport News, Va.

[73] Assignee: The United States of America as represented by the Administrator of the National Aeronautics & Space Administration, Washington, D.C.

[21] Appl. No.: 846,430

[22] Filed: Mar. 31, 1986

[51] Int. Cl.⁴ .................. G09B 21/00; A61F 9/08
[52] U.S. Cl. ........................... 434/114; 340/407
[58] Field of Search ............... 434/114, 116; 340/407

[56] References Cited

U.S. PATENT DOCUMENTS 3,851,745 12/1974 Orazaki et al. .................. 434/114
4,266,936 5/1981 Rose et al. ..................... 434/114
4,473,356 9/1984 Fernando et al. ................ 434/114

Primary Examiner—William H. Grieb
Attorney, Agent, or Firm—George F. Helfrich; John R. Manning

[57] ABSTRACT

A reading device for the blind for reading Braille Text directly from magnetic tape without embossing the characters on paper. A magnetic tape containing Braille Text is unloaded a page at a time into memory. The individual letters in the text are tactilly displayed using pins driven by solenoids. A position detecting "mouse" is used to control the movement from one letter to the next. The mouse is similar to those commonly used with computers. The braille display may be mounted on top of the mouse.

25 Claims, 1 Drawing Figure

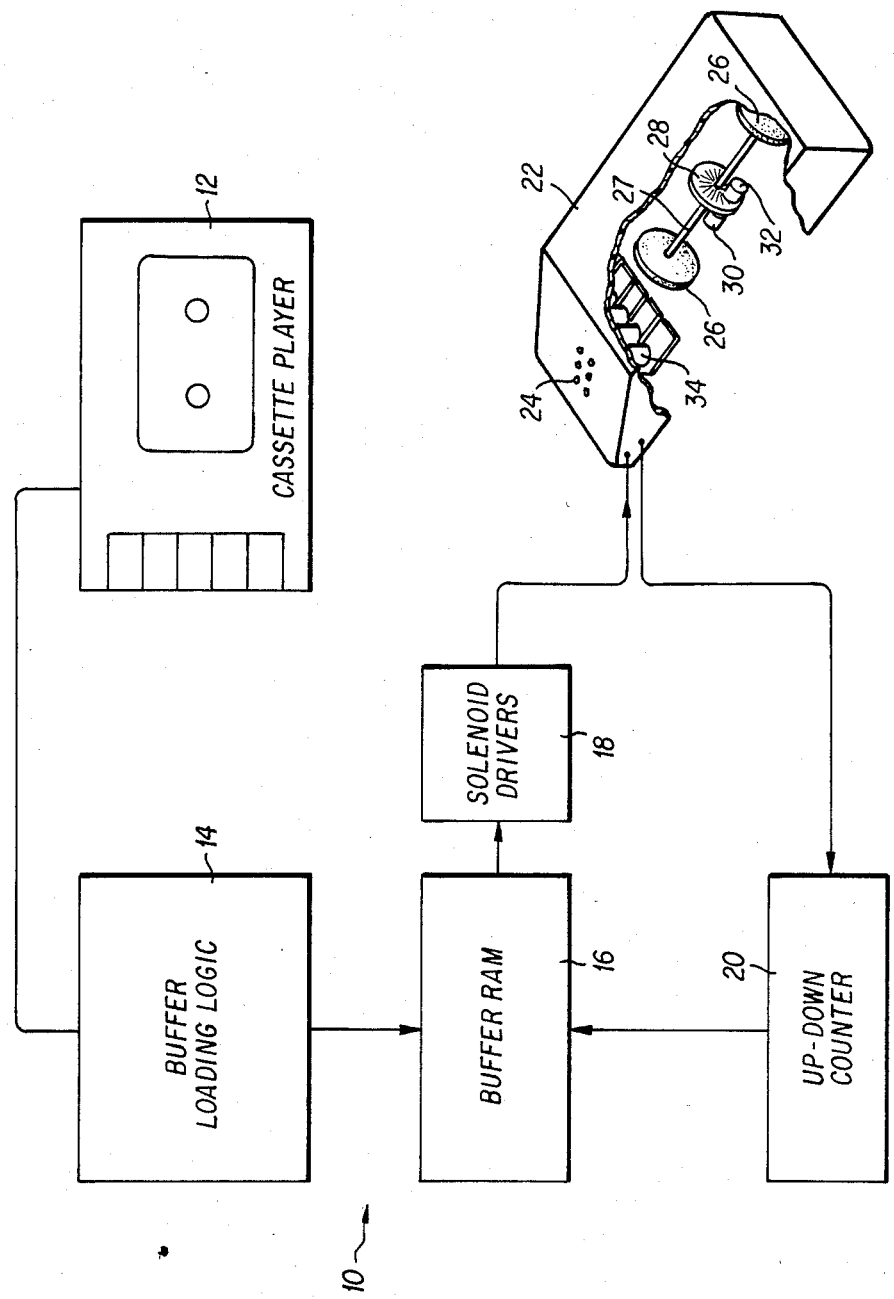

BRAILLE READING SYSTEM

ORIGINE OF THE INVENTION

The invention described herein was made by an employee of the United States Government and may be manufactured and used by the government for governmental purposes without the payment of any royalties thereon or therefore.

TECHNICAL FIELD

This invention relates generally to a system for reading braille and more particularly to a device for displaying braille characters wherein the movement of the display is manually controlled.

BACKGROUND ART

In order to allow blind people to live as normally as possible, a number of reading systems have been proposed over the years which allow blind people to read printed materials. These include various forms of optical character recognition systems which read the text for the blind person and produce an oral or tactile display of the text. Other systems rely on the braille tactile reading system, but present the braille letters in a more convenient format. Several recent devices utilize an electromechanically driven braille cell for tactilly displaying text which has been recorded electromagnetically.

One example of a recent system shown in U.S. Pat. No. 4,473,356 shows an electromechanical braille cell where the ends of rods protrude through openings in a braille reading surface. When the rods are energized, the ends which protrude form a braille letter. Such a device would allow braille reading of electromagnetically recorded text, however there is no provision for the control of the speed of reading by the operator. Accordingly, the reader may not easily adjust the device to his own reading speed nor allow him to reread any characters which he has missed.

Another device shown in U.S. Pat. No. 4,266,936 presents an entire page of braille characters in response to text stored on a taped cassette. While such a device allows the reader to move at his own speed across the page, it requires a large number of electromechanical devices and a relatively large device for displaying the entire page. Thus, such a device could be expensive and bulky.

An earlier device shown in U.S. Pat. No. 3,851,745 shows an electric braille recording and reproducing system where information which is recorded can be retrieved tactilly. However, this device does not include an easily operated control device for controlling the speed of presentation of the characters.

Thus, devices such as these have many shortcomings in that they are complex electronically, bulky, expensive and difficult to operate. Many of these devices make it difficult for the operator to reread a character or to move through the page at his own speed.

STATEMENT OF INVENTION

Accordingly, one object of this invention is to provide a novel braille reading system for the blind.

Another object of this invention is to provide a braille reading system with an operating speed controlled by the operator.

A further object of this invention is to provide a simple, inexpensive and convenient device for braille reading.

Another object of the invention is to provide a braille reading system controlled by the use of a position sensing mouse.

Another object of this invention is to provide a novel reading system for the blind for reading braille letters from electromagnetically recorded text where the speed of presentation of the letters is controlled by the operator using a position sensing mouse.

Briefly, these and other objects of the invention are achieved by providing a braille cell on a position sensing mouse which may be moved across a surface by the operator. As the mouse moves, the braille letters are presented at a corresponding speed. By controlling the speed and direction of the mouse, the speed of reading and repetition of characters may be accomplished.

BRIEF DESCRIPTION OF THE DRAWING

A more complete appreciation of the invention and the many of the attendant advantages thereof will be readily obtained as the same becomes better understood by reference to the following detailed description when considered in connection with the accompanying drawing, wherein:

The figure is a schematic diagram of the present invention.

DETAILED DESCRIPTION OF INVENTION

Referring now to the drawing, wherein the device 10 is shown as including the cassette player 12. The cassette player is used to play electromagnetically recorded data from a common magnetic tape cassette. The output of the cassette player is connected to the buffer loading logic 14, which receives the recorded data from the player and also controls the length of time of play of the player. Thus, the buffer loading logic controls the player so that it receives only a given amount of text at a time. The buffer loading logic forwards the received text to the buffer random access memory 16. The method of controlling the cassette player to load the buffer memory is well known in the art. In effect, this procedure is commonly used in most home computers which include such logic and memory devices. Thus, the text is stored in the buffer RAM and is retrieved from this memory as it is needed for display.

The characters are sequentially removed one at a time from the memory 16 and then forwarded to the solenoid drivers 18 under the control of the up-down counter 20. The solenoid driver uses the character information to drive the six pin braille display 24 mounted on the surface of mouse 22. Since the text which has been recorded is commonly already in a braille code, the solenoid drivers only act to amplify the signals before driving the solenoids. Thus, no decoding is normally needed at this point. However, should the text be encoded in a different code, a code converter could be inserted at this point.

The mouse is similar to those currently used with computers for moving a cursor or other indicia on a display screen. Such devices include a motion sensor or position sensor to control the movement of the cursor. A mouse from such a home computer could be used, although in the preferred embodiment one set of the movement sensors is removed so that a display is only controlled in one dimension.

In the present invention, the mouse has mounted along its bottom side a pair of friction wheels 26 which are connected by means of an axle 27. As the mouse is moved from side to side on a surface the friction wheels, which are in contact with the surface, are driven causing the axle 27 to rotate. A pickoff wheel 28 is also mounted on this axle and is rotated along with the axle as the mouse is moved. The pickoff wheel includes a series of slits on its surface which are regularly spaced. A light 30 and an optical detector 32 are mounted on opposite sides of the pickoff wheel. As the wheel rotates, the individual slits appear in the path between the light and photocell. Thus, as each slit passes between the light and photocell, the photocell receives a short pulse of light. This is converted into a short pulse of electricity indicating that the mouse has been moved by a predetermined distance. The optical detector has been shown as a single device to detect the light pulses. It is also possible to have two detectors being offset from each other half the distance between slits. This would enable the device to determine not only how many distance pulses are being produced, but whether the device is moving to the right or left. This allows the device to move backwards as well as forward while still retaining an accurate determination of its position. This distance signal is then forwarded to the up-down counter 20 which records the position of the mouse. After the counter has received a certain number of pulses, indicating that the mouse has moved a sufficient distance, the RAM is controlled to forward a new character to the solenoid drivers.

The character information received by the solenoid drivers is used to control the actuator 34 for driving the various pins in the braille display 24. Each pin is connected to a separate actuator and are selectively energized to form the proper braille code. The actuators typically constitute solenoids, however, other actuators may be used, such as piezoelectric drivers.

In operation, a tape cassette containing the desired text is placed in the cassette player 12. The buffer loading logic 14 controls the cassette player to play back one or two pages of text at a time. The amount of text retrieved at a time is only limited by the size of the memory used. The retrieved text is stored in the buffer RAM 16. The operator then holds the mouse 22 so that it may be moved sideways across a hard surface. The hand is held such that the fingers are in contact with the braille display 24. As the operator moves the mouse, the friction wheels cause the optical pickoff wheel to rotate producing electrical signals which are forwarded to the up-down counter to give an indication of the position of the mouse. When the mouse moves a predetermined distance, the memory is controlled to sequentially present the next character stored therein. As each character is received by the solenoid drivers, the solenoids drive the pins in the braille display upwardly to form a braille character. This character is held until the mouse moves the necessary distance to cause the next character to be displayed. By controlling the speed at which the mouse moves, the operator can cause the characters to appear at a convenient reading speed. It is also possible to reverse the direction of the mouse to retrieve a character which had previously been displayed.

While the device is shown as including a single braille display, it is possible to have two or more such displays present so that several characters may be displayed at once for faster reading.

While the mouse shown utilizes only a single directional sensor, it would also be possible to include a two dimensional sensor if desired. Such two dimensional sensors are commonly used with mice associated with two dimensional computer displays. However, the one dimensional movement is considered to be preferable since this prevents the reader from accidently skipping to the next line if the mouse is moved at an angle. Accordingly, by using a single dimensional sensor, the characters are presented as if in a single long line.

When the operator has moved the mouse to a convenient stopping place, it may be lifted up and returned to a convenient starting place on the surface for continued movement of the characters. As long as the friction wheels do not move in this process, the character presented will not advance until the mouse is set back down. However, it would be possible to include a manually operated button on the mouse for retaining the count in the counter 20 until the button is released so as to prevent any change in the characters displayed despite any accidental movement of the wheels. Other control function buttons can also be added to the mouse if desired.

It is also possible to utilize other stored forms of text than cassette recordings. Any such text may be used as long as it is readily transferable into a form which may be stored in memory and recovered one character at a time.

Thus, the use of the invention described above allows the blind reader to read the recorded text in a manner which closely simulates the normal procedure of scanning a printed text with fingers. It also allows the operator to control the reading speed and to recall the characters which have been already read. In addition, the device is simple to operate and is not bulky.

Obviously, numerous additional modifications and variations of the present invention are possible in light of above teachings. It is therefore to be understood that within the scope of the appended claims, the invention may be practiced otherwise than is specifically described herein.

I claim:

1. A braille reading method comprising the steps of:
providing a source of a text;
transferring said text from said source to a memory means;
converting said text to braille letters one letter at a time;
energizing selectively a plurality of solenoids;
driving selectively a plurality of pins with said energized solenoids to form a braille letter;
moving a position sensor to drive friction wheels mounted on an axle;
rotating an optical pick-off wheel mounted on said axle by moving said position sensor;
producing a series of optical pulses;
converting said light pulses to an electric distance signal;
counting said distance signals; and
changing said formed braille letter to the prior or subsequent braille letter relative to a decrease or increase in said counted distance signals.

2. A braille reading method comprising the steps of:
retrieving textual information from a recorded text;
transferring said textual information to a memory means;
controlling the rate of retrieval by logic means;
converting said text to braille letters one letter at a time;

displaying said braille letters in a tactile display;
detecting the motion of a movable probe to determine its position;
storing the position of said probe; and
controlling the change of the letter displayed in accordance with the stored position.

3. A braille reading system comprising:
a source of a text;
memory means for receiving said text from said source;
a braille display device connected to said memory means for tactilly displaying a part of said text;
a manually movable probe; and
a position sensor connected to said memory means for determining the position of said probe and changing the part of said text to be displayed in response to a change in position of said probe.

4. A braille reading system according to claim 3, wherein said source of a text is a cassette player.

5. A braille reading system according to claim 3, further comprising logic means for controlling the retrieval of said text from said source.

6. A braille reading system according to claim 2, wherein said memory means receives said text through said logic means.

7. A braille reading system according to claim 3, wherein said memory means is a buffer random access memory.

8. A braille reading system comprising:
a source of a text;
memory means for receiving said text from said source;
a braille display device connected to said memory means for tactilly displaying a part of said text, including a plurality of solenoid drivers connected to said memory means, a plurality of solenoids each connected to a corresponding one of said solenoid drivers, and a plurality of pins each driven by a corresponding one of said solenoids, wherein said plurality of pins forms a tactile display;
a manually movable probe; and
a position sensor connected to said memory means for determining the position of said probe and changing the part of said text to be displayed in response to a change in position of said probe.

9. A braille reading system according to claim 8, wherein said braille display device is mounted on said probe.

10. A braille reading system according to claim 8, wherein said braille display device displays one character at a time.

11. A braille reading system according to claim 8, wherein said braille display device displays a plurality of characters at a time.

12. A braille reading system comprising:
a source of a text;
memory means for receiving said text from said source;
a braille display device connected to said memory means for tactilly displaying a part of said text;
a manually movable probe; and
a position sensor connected to said memory means for determining the position of said probe and changing the part of said text to be displayed in response to a change in position of said probe, including a motion detector and a position storage means.

13. A braille reading system according to claim 12, wherein said position storage means is an up-down counter.

14. A braille reading system according to claim 12, wherein said motion detector includes an optical pickoff wheel, a light source and a light detector.

15. A braille reading system according to claim 14, wherein said motion detector further includes friction wheels joined by an axle.

16. A braille reading system comprising:
a recorded text;
player means for retreiving textual information from said recorded text;
logic means connected to said player means for controlling the rate of retrieval from said player means and for receiving said textual information;
memory means connected to said logic means for receiving said textual information from said logic means;
a braille display means connected to said memory means for tactilly displaying a part of said textual information;
postion storage means connected to said memory means for controlling said part of said textual information to be displayed;
a manually movable probe; and
a motion detector connected to said position storage means for detecting the movement of said probe and for storing the position of said probe in said position storage means;
whereby the movement of said probe causes a different part of said textual information to be displayed.

17. A braille reading system according to claim 16, wherein said recorded text is a tape cassette and said player means is a cassette recorder.

18. A braille reading system according to claim 16, wherein said memory means is a buffer random access memory.

19. A braille reading system comprising:
a recorded text;
player means for retreiving textual information from said recorded text;
logic means connected to said player means for controlling the rate of retrieval from said player means and for receiving said textual information;
memory means connected to said logic means for receiving said textual information from said logic means;
a braille display means connected to said memory means for tactilly displaying a part of said textual information, including a plurality of solenoid drivers connected to said memory means, a plurality of solenoids each connected to a corresponding one of said solenoid drivers, and a plurality of pins each driven by a corresponding one of said solenoids, wherein said plurality of pins forms a tactile display;
postion storage means connected to said memory means for controlling said part of said textual information to be displayed;
a manually movable probe; and
a motion detector connected to said position storage means for detecting the movement of said probe and for storing the position of said probe in said position storage means;
whereby the movement of said probe causes a different part of said textual information to be displayed.

20. A braille reading system according to claim 19, wherein said braille display device is mounted on said probe.

21. A braille reading system according to claim 19, wherein said braille display device displays one character at a time.

22. A braille reading system according to claim 19, wherein said braille display device displays a plurality of characters at a time.

23. A braille reading system according to claim 16, wherein said position storage means is an up-down counter.

24. A braille reading system according to claim 16, wherein said motion detector includes an optical pickoff wheel, a light source and a light detector.

25. A braille reading system according to claim 24, wherein said motion detector further includes friction wheels joined by an axle.

* * * * *